(12) United States Patent
Bhattacharya et al.

(10) Patent No.: US 7,047,385 B1
(45) Date of Patent: May 16, 2006

(54) HIGH-SPEED MEMORY FOR USE IN NETWORKING SYSTEMS

(75) Inventors: Dipankar Bhattacharya, Saratoga, CA (US); Jeff Hirschman, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 10/462,866

(22) Filed: Jun. 16, 2003

(51) Int. Cl.
*G06F 12/00* (2006.01)

(52) U.S. Cl. .......................................... 711/169; 711/5

(58) Field of Classification Search .................... 711/3, 711/5, 100–114, 120; 709/212; 710/3, 7, 710/13, 37; 370/351, 379; 713/500–503
See application file for complete search history.

(56) References Cited

U.S. PATENT DOCUMENTS

| | | | | |
|---|---|---|---|---|
| 5,778,419 A | * | 7/1998 | Hansen et al. | 711/112 |
| 5,835,941 A | | 11/1998 | Pawlowski | |
| 5,926,838 A | * | 7/1999 | Jeddeloh | 711/167 |
| 6,065,092 A | * | 5/2000 | Roy | 711/5 |
| 6,128,696 A | * | 10/2000 | Farmwald et al. | 711/105 |
| 6,189,073 B1 | | 2/2001 | Pawlowski | |
| 6,201,740 B1 | * | 3/2001 | Seyyedy et al. | 365/189.01 |
| 6,351,427 B1 | * | 2/2002 | Brown | 365/230.03 |
| 6,426,656 B1 | * | 7/2002 | Dally et al. | 327/51 |
| 6,427,197 B1 | * | 7/2002 | Sato et al. | 711/169 |
| 6,563,893 B1 | * | 5/2003 | Smith et al. | 375/354 |
| 6,614,268 B1 | * | 9/2003 | Dally et al. | 327/51 |
| 6,697,603 B1 | * | 2/2004 | Lovinggood et al. | 455/13.1 |
| 6,725,390 B1 | * | 4/2004 | Liu et al. | 713/401 |
| 6,747,997 B1 | * | 6/2004 | Susnow et al. | 370/509 |
| 6,779,097 B1 | * | 8/2004 | Gillingham et al. | 711/167 |
| 6,910,196 B1 | * | 6/2005 | Cocchini | 716/6 |

* cited by examiner

*Primary Examiner*—Mano Padmanabhan
*Assistant Examiner*—Daniel Ko
(74) *Attorney, Agent, or Firm*—Charles E. Krueger (57) ABSTRACT

A memory integrated circuit includes an array of high-speed memory blocks coupled to the address input interface and data output interface of the integrated circuit by address and data pipelines clocked at the same rate as the high-speed memory blocks. After an initial read latency, data is read from the memory at the same speed it is read from the high-speed memory blocks.

9 Claims, 6 Drawing Sheets

HIGH-SPEED MEMORY FOR USE IN NETWORKING SYSTEMS

BACKGROUND OF THE INVENTION

Manufacturers of routing platforms, such as the assignee of the present application, are designing new routing platforms that will be orders of magnitude faster than existing products. These routing platforms will require high-capacity external memory chips for storing packets that are faster than any memory products now available or being designed.

A routing processor includes switching engines, such as Application Specific Integrated Circuits (ASICs), that receive packets at a very high rate and must quickly store the packets in an external high-capacity, high-speed memory. The ASIC then determines the route of the packet and accesses the packets from memory at a very high rate to be forwarded to the next destination. This is the store and forward memory model.

The fastest external memory integrated circuits (ICs) now in existence are SRAMs utilized as caches in workstations. The workstation needs access to data almost instantaneously and therefore the latency of the cache, i.e., the time delay between requesting and receiving data from the memory, is very low.

Currently, as technology allows for faster chip designs, SRAM manufacturer's are increasing the size of the memory chips. As is known in the art, as chip size increases the time to retrieve data from a chip increases. Therefore, current projections for SRAM speeds predict manufacturers will elect to increase chip size thereby not significantly increasing throughput.

Small, embedded, high-speed internal RAMs coupled to logic inside ASICs and other custom chips currently exist that operate at speeds up to 500 to 700 MHz. These small arrays can be made to run very fast by limiting the number of cells on each word line and bit line. Such techniques are commonly used in 1$^{st}$ level cache integrated with CPUs that today run up to multiple GHz.

However, these embedded, high-speed RAMs cannot be directly connected to function as external RAM for the types of ASICs used in routing platforms and do not have enough capacity to serve as packet storage memories for switching ASICs.

BRIEF SUMMARY OF THE INVENTION

In a first embodiment of the invention, a high-capacity, high-speed external memory is formed on a single IC in the form of set of embedded high-speed memory blocks, with addresses input from an address interface of the IC supplied to the high-speed memory blocks by an address pipeline and data read from the high-speed memory blocks supplied to a data out interface of the IC by a data pipeline. Data can be read from the high-capacity, high-speed memory at the speed of the embedded high-speed memory blocks and the speed in not decreased by increasing the capacity of the memory IC.

In another embodiment of the invention, the high-speed data and address pipelines are clocked data buses coupled by repeaters coupling bus segments. These repeaters are clocked at substantially the same rate that data can be accessed from the high-speed memory blocks.

In another embodiment of the invention, sets of data input pins are associated with a single clock input pin to form a clock group. A receiver interface utilizes a source derived clock signal received on the clock input pin to sample data signals received at the associated data input signals. The inputs pins of a clock group are located in close proximity on the IC so that variations in temperature and other external factors have the same effect on all signals in the group.

In another embodiment a clean copy of the source clock is utilized by both the memory IC and an ASIC that is accessing the memory IC.

In another embodiment of the invention, clock signals from different clock groups are aligned by deskew logic.

Additional features and advantages of the invention will be apparent from the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

A high-speed external memory chip will now be described that operates at speeds up to 500 to 700 Mhz. This memory chip is suitable for use in networking systems where high speeds are required but low latency is not required.

The needs of a networking system are different from a work station. In a work station environment the SRAM is used as a cache and very high speed access (low latency between the request for data and the output of data) is required. While networking ASICs run at very high speed, low latency is not a requirement. Memory access latency is relatively very small compared to the total delay of packets in a system. So there is no appreciable system performance degradation due to memory latency. The network system needs to be able to request data at a very high rate but the data may be returned at the same high rate after a delay because the latencies associated with memory access are small compared to latencies due to the network.

As is known in the art, there are two ways to increase the throughput of data access from a RAM: 1) widen the data bus and output more data each clock; and, 2) increase the clock speed. Once the data bus has widened to the practical limit than the clock speed must be increased.

The inventors have discovered a new IC memory architecture that partitions a high-capacity memory into several smaller, high-speed embedded memories coupled with associated logic units to form a high-speed memory IC having greater read latency then the SRAMs designed for workstations described above. This system can be utilized in a networking environment because the read latency requirement is relaxed for the reasons above-described.

Thus, each embedded memory array operates at a high data rate. However, because of large chip size and the extra logic units that interface with the embedded memory array the delay between the receipt of a data request and the appearance of read data on the read bus may be more than several clock cycles. Data read from the embedded memory arrays is read to a clocked data bus at the high data rate and provided to an output interface, where after a delay period, it is read out at the high clock rate.

Figure 1A:
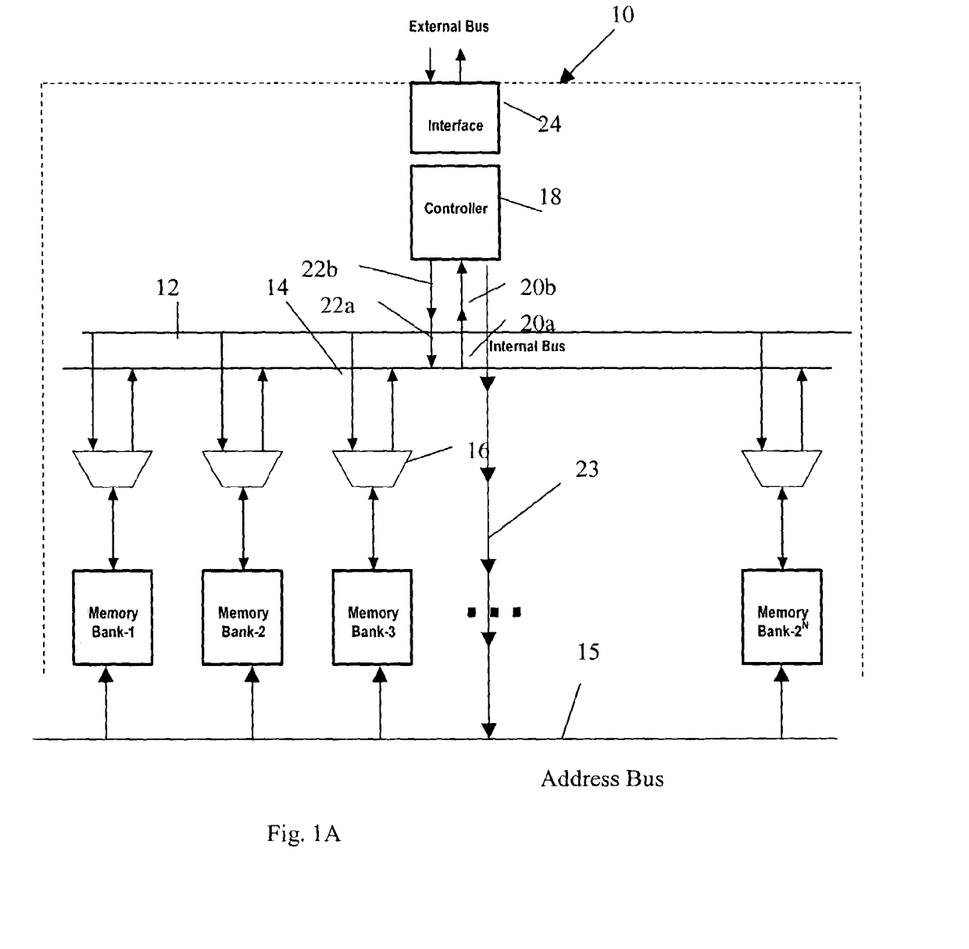
FIG. 1A is a high level block diagram of an embodiment of the invention.

FIG. 1A is high-level block diagram of an embodiment of the invention. An external memory IC 10 includes a first array of embedded high-speed memory banks MB1–MB2$^N$. Each memory bank in an array can complete a single read or write transaction in one clock cycle, $T_c$. The high-speed memory banks are coupled in parallel to internal read and write data buses 12 and 14 and an address bus 15. Each embedded high-speed memory bank includes a data port coupled to either the read or write bus 12 or 14 by a data selector 16. An interface 24 includes an input interface to received address, command, and write data and an output interface to output read data.

Only a single array of high-speed memory banks is depicted in FIG. 1A, however as will be apparent, the described embodiment can utilize multiple arrays of memory banks.

Each of the arrows in FIG. 1A represents a data bus on which a single data transfer can occur in a cycle time of $T_c$. First, second, and third pipelines 20, 22, and 23 are indicated as formed by multiple arrows and are required to transfer data from a memory array to the interface over a large dies due to silicon implementation limitations. The first pipeline 20 couples the internal read bus to the interface 24, the second pipeline 22 couples the internal write data bus to the interface, and the third pipeline 24 couples the internal address bus to the interface 24. It is understood that only several bus segments are depicted in FIG. 1A to indicate a pipeline, the actual number of segments will be determined by die size and implementation details.

The interface 24 couples the external memory IC 10 to an external bus (not shown). On the input side of the interface 24 write data has to be deskewed and aligned with received address and command data. This deskewing and alignment delays the transfer of write data to the memory banks. Because the sequence of write and read operations must be maintained, the deskewing and alignment delay of the write operation adds to the delay in accessing read data, thereby increasing read latency.

For large dies, due to silicon implementation limitations, internal transactions need to be pipelined. As the size of the die increases, deeper pipelines having more repeaters are required as is known in the art. The actual assignment of pipelined operation to clock cycles depends on the implementation.

Some implementation details will now be described. Thus, as described above, clocked repeaters may be required to carry address and commands to memory arrays disposed far from the input interface 24. If multiple arrays are used part of the address can be utilized to determine if a particular array needs to be accessed. In the case of multiple arrays, for a particular selected memory array, another part of the address is used to activate a word line and a last part of the address to select bit lines. Clocked repeaters may be required to transfer read data to output pins disposed far from the memory array. Also, read-data from a particular array may be multiplexed with read-data lines from other memory arrays.

The operation of the system depicted in FIG. 1A will now be described with reference to that figure and the timing diagram of FIG. 1B. When an address is received on internal bus of the memory array depicted in FIG. 1A, at time $T_N$ a first data word (D0) is output onto the internal bus.

In one embodiment, the pipelines coupling the interface and internal data busses are coupled by N repeaters clocked at $T_c$. Thus, the address and command data will be present on the internal data bus after a delay of at least $NT_c$ from the time the data is received at the interface. Also, the data read from the memory array will arrive at the controller and interface after a delay of at least $NT_c$. As described above, additional read latency is caused by the time necessary to deskew address, command, and write data. A larger die would require more repeaters and thus increase the read latency.

Figure 1B:
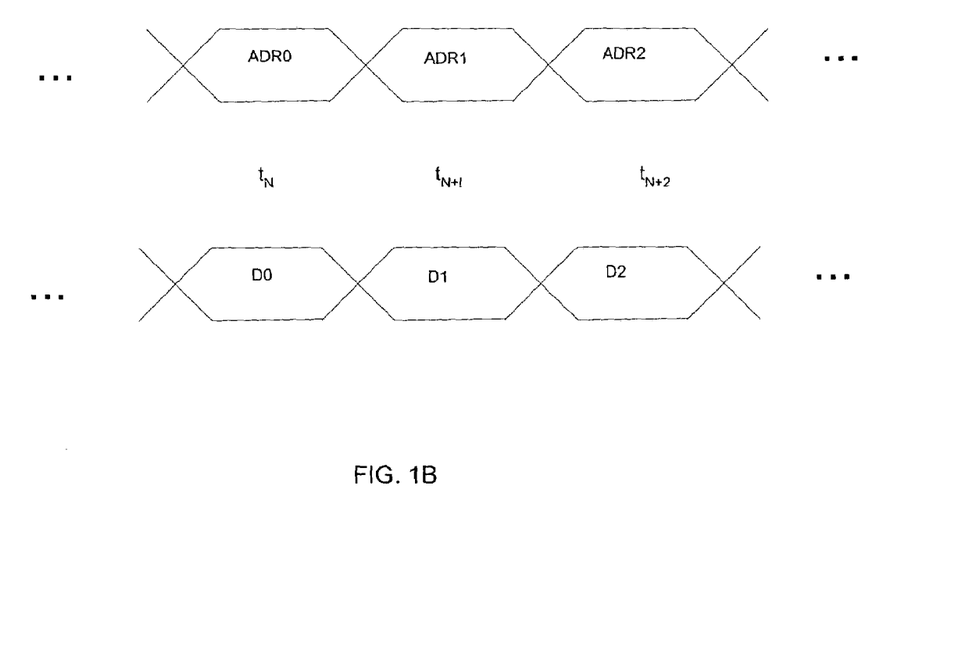
FIG. 1B is a timing diagram illustrating the operation of the embodiment depicted in FIG. 1A.

However, as is apparent from FIG. 1B, after the expiration of the read latency, read data will be presented at the output at the clock rate. Thus, the use of the high-speed, embedded memory arrays facilitates reading data from the memory arrays at a very high clock speed.

The clocked data and address buses function as pipelines to transfer addresses and command data from the input interface to the high-speed memory array and to transfer data from the high-speed memory array to the output interface. As is well known in the art, when a pipeline is started there is a delay before information reaches a certain point (the latency of the pipeline) but subsequent to the delay information is provided at the full pipeline capacity.

Thus, if the high-speed memory blocks run at, for example, 700 MHz, then the address and data buses can be clocked at substantially that speed so that a switching ASIC can store and access data at that high rate. Further, the number of high-speed memory blocks included on the external memory chip can be large to assure high enough capacity. As the number of high-speed memory block included on the memory chip increases the read latency will increase because of increase in size of the chip. However, the throughput of reading data from the memory will not decrease.

In this embodiment, several features are included that improve performance during high speed operation, some of which also contribute to increased read latency. These features include clean copies of a source clock to both the ASIC and the interconnected memory chip, multiple copies of source clocks grouped with a set of data lines to form clock groups, and skewing or inversion of output signals to reduce noise due to simultaneous switching. Each of these features will be described in more detail below.

Figure 2:
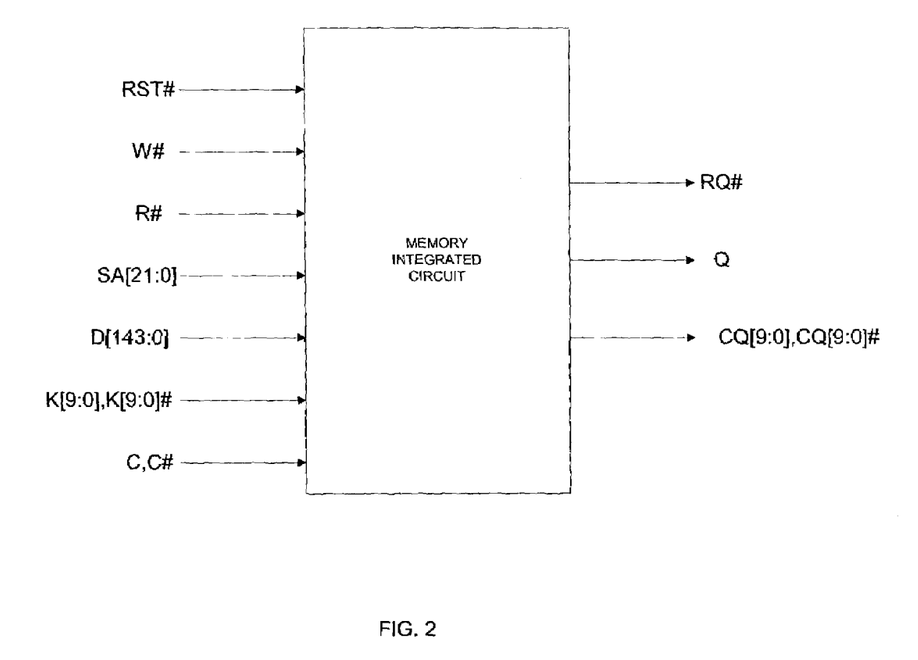
FIG. 2 is a block diagram depicting functional interfaces.

FIG. 2 depicts the functional interfaces of the an embodiment of the invention. Briefly, the W# and R# signals are used to schedule read and write operations; SA is the address bus; Q is the read bus; RQ# is the echo read control; C and C# are reference clock inputs; K[9:0],K[0,0]# are the input clock lines; D is the write bus; and CQ[9,0],CQ[9,0]# are the echo clock lines. The functions of these interface lines will be described in more detail below.

Figure 3:
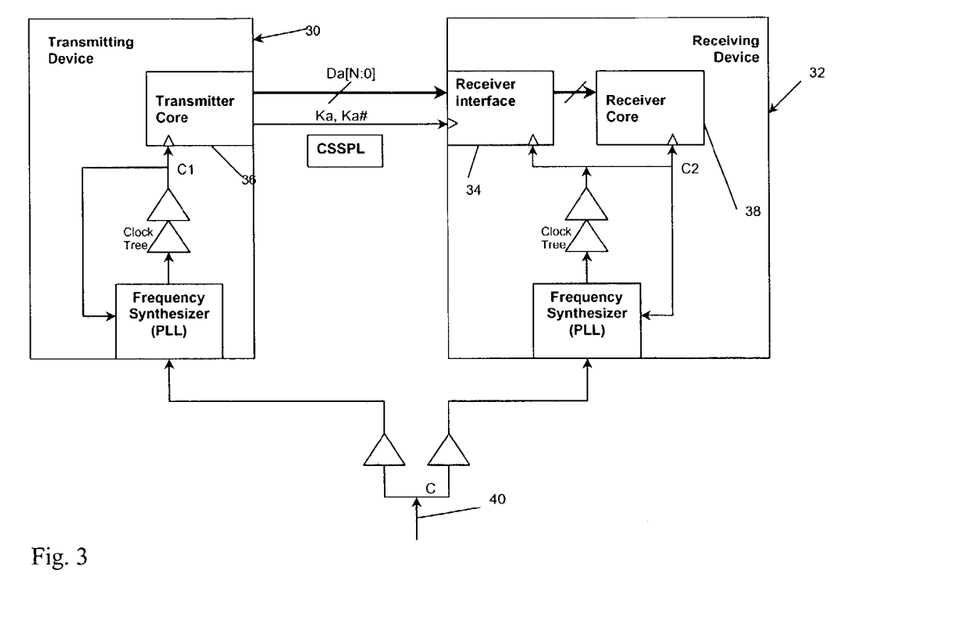
FIG. 3 is a block diagram depicting an embodiment for providing clean copies of the system clock.

FIG. 3 depicts the clean source clock feature of an embodiment of the invention. In FIG. 3 a transmitting device 30 and a receiving device 32 are depicted. The transmitting device 30 is coupled to the receiver interface 34 in the receiving device 32 by a data bus, Da[N:0] and a set of clock lines, Ka, Ka#. Both the receiving and transmitting devices have clock pins, C and C#, for receiving copies of an external clock signal 40 at a clock input, which can be a single pin or a pair of pins to receive a differential clock signal or true and compliment copies of a single-ended clock signal, which is used to form the internal clock signals for the transmitter core 36 and the receiver core 38.

As is known in the art, if, for example, the transmitting device is a switching ASIC and the receiving device is a memory device, the receiving device derives its system clock from the source clock, in this case Ka, Ka#, provided by the ASIC. However, the source clock includes jitter due to ground bounce and other effects caused by the ASIC driving data on the data lines and performing other functions. If the source clock driven by the transmitting device is used to derive the core clock of the receiving device, the core clock of the receiving device has additional jitter. This additional jitter increases the minimum cycle-time supported by the core of the receiving device and hence reduces the maximum rate at which the receiving device can operate.

In the presently described embodiment, as depicted in FIG. 3, both the transmitter and receiver cores derive their internal clock from copies of the same external system clock. Thus, in this embodiment the memory device derives its internal clock from the clean (low-jitter) external system clock instead of from the high-jitter source clock received on Ka, Ka#.

Figure 4:
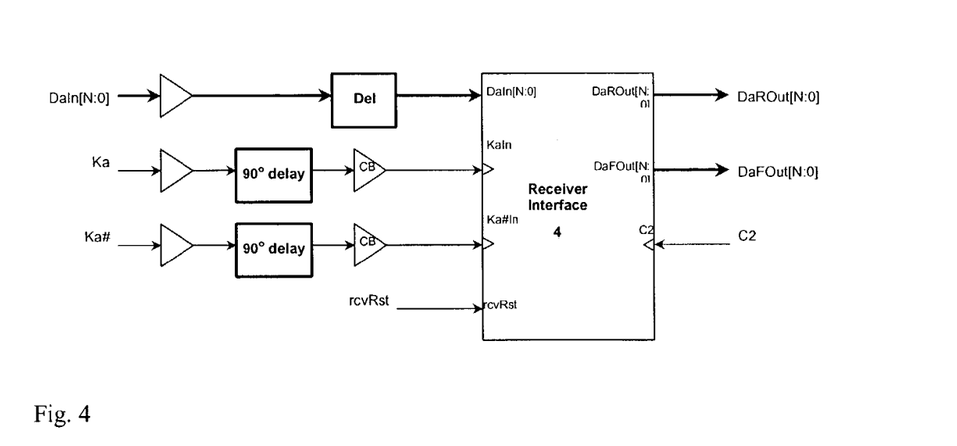
FIG. 4 is a block diagram of an embodiment of the receiver interface model.

At the receiver a FIFO is necessary to change from the source clock domain (Ka) of the receiver interface 34 to the internal clock domain (C2) of the receiver core 38. The receiver interface model is depicted in FIG. 4. The receiver interface utilizes the source clock to sample the input signals and transfers the signal to the internal C2 clock domain.

In FIG. 4, the receiver interface delays the clock inputs by 90° to align the clock edges to the center of the data window. The delay-line, Del, delays the data bus (Da[N:0]) by the same amount as the clock-buffers (CB). The receiver interface includes FIFOs which are clocked in by the KaIn and KaIn# clocks and clocked out by the clock of the internal clock domain (C2).

In one embodiment, the receiver interface also includes logic and circuitry for inverting the output signals to minimize the transitions on the read bus. If a current bus output signal has more than half its signals inverted from the previous bus output signal than the current output signal is inverted. The time required to calculate whether the bus output signal must be inverted also adds to the read latency.

Figure 5:
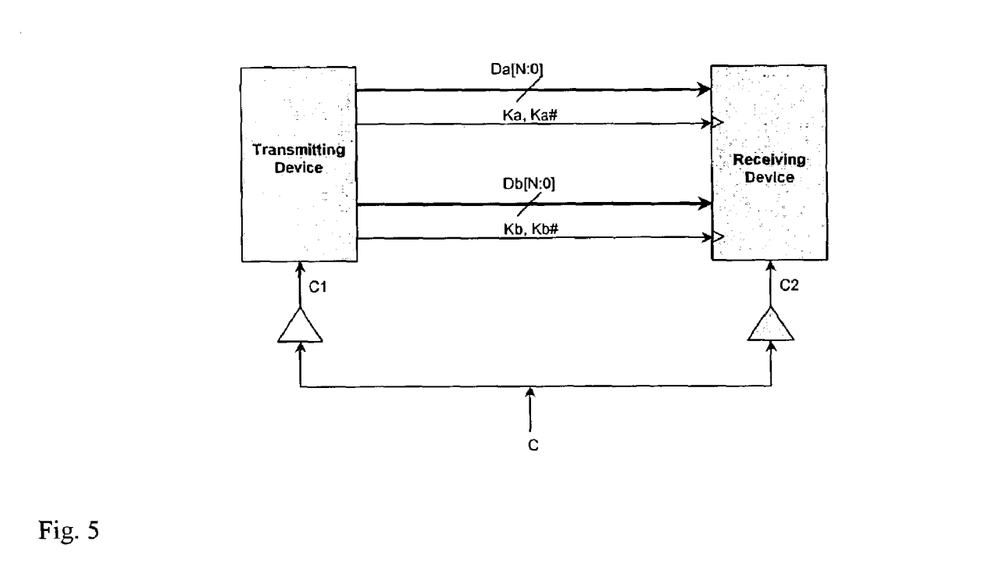
FIG. 5 is a block diagram depicting two clock groups.

FIG. 5 depicts the transmitting and receiving devices and two clock groups, Da[N:0] and Db[N:0]. In this embodiment the number of data pins associated with a pair of clock pins is limited to 18. Each pair of clock-pins and the associated data pins are referred to as a clock group. The receiver interface utilizes a clock signal received on the clock pin to sample data received on the associated data pins. The skew on the small number of pins included in a clock group can be limited because of close proximity of I/O on the die, close proximity of I/O on the package, and tightly matching board trace lengths.

Figure 6:
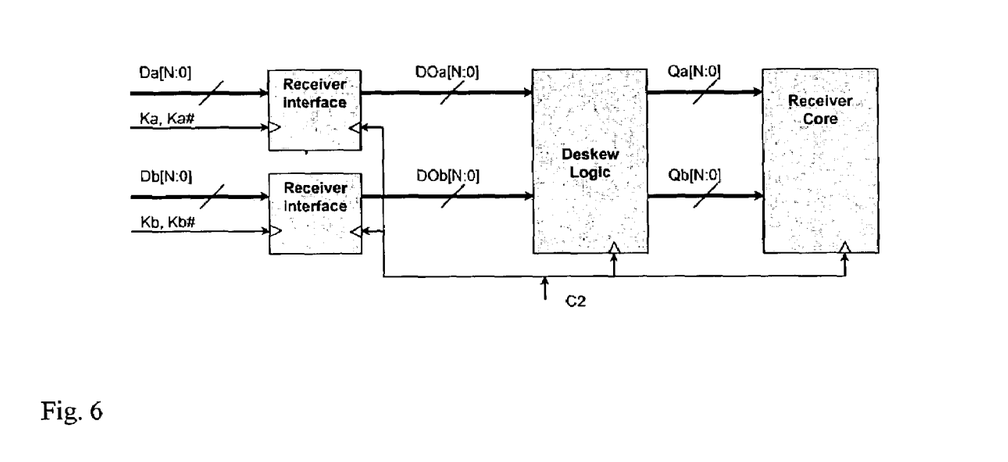
FIG. 6 depicts an embodiment of the de-skew logic.

However, there may be significant skew between the clock signals in different clock groups. An embodiment of receiving device including de-skew logic to de-skew clock signals from different clock groups is depicted in FIG. 6. In this embodiment, each clock group is received at a different receiver interface. The outputs of each receiver interface are clocked out using the core clock (C2) which also clocks the De-skew Logic.

A protocol which is run at device initialization is used to align the edges of the different copies of the sourced clock. A pattern is driven on the pins and the de-skew logic aligns the different copies of the source clock at the receiver.

Figure 7:
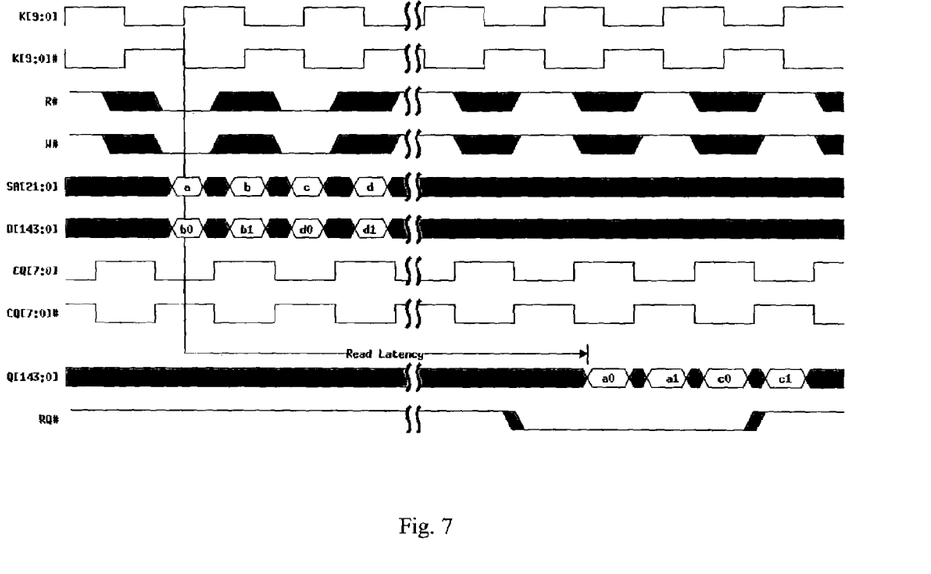
FIG. 7 is a timing diagram depicting the operation of an embodiment of the invention.

FIG. 7 is a timing diagram of an embodiment of the invention. In this example, a read is scheduled when R# is asserted and the read address is sampled on the rising edge of K[9:0]#. Data {a0, a1} is read from address a and data {c0, c1} is read from address c. Note that the read latency is defined as the time duration from the time when the address data is sampled to the time the read data is driven onto the read bus Q. The RQ# signal is asserted to indicate that valid read data can be sampled from the Q bus.

Thus, an architecture of a high-speed, high-capacity external memory chip has been described. Several of the features described above lead to increased read latency of the chip. However, due to the relaxed latency requirements in a network environment the new chip architecture will meet the memory requirements of next generation, high-speed routing platforms.

The invention has now been described with reference to the preferred embodiments. Alternatives and substitutions will now be apparent to persons of skill in the art. For example, the particular timing described above is provided by way of example. Depending on bus and memory design some operations may require more than a single clock cycle and other operations may be combined in a single clock cycle. Accordingly, it is not intended to limit the invention except as provided by the appended claims.

What is claimed is:

1. An external memory IC for use in a networking system having relaxed read latency requirements, said memory IC comprising:
   a plurality of memory arrays, each memory array including a plurality of embedded memory banks, each memory bank having a data input, a data output, and an address input, and with each memory bank completing a read or write transaction in a cycle time of $T_c$;
   a plurality of internal read buses, with each internal read bus coupled in parallel to the data outputs of all the memory banks in a corresponding array;
   a plurality of internal write buses, with each internal write bus coupled in parallel to the data inputs of all the memory banks in a corresponding array;
   a plurality of internal address buses, with each internal address bus coupled in parallel to the address inputs all the memory banks in a corresponding array;
   an address input interface for receiving read address data;
   an address pipeline, including a plurality of clocked repeaters coupling internal address buses, with the address pipeline coupling the address input interface to the internal address buses;
   an output data interface outputting read data;
   a data pipeline, including a plurality of clocked repeaters, with the data pipeline coupling the internal read buses to the output data interface.

2. The memory of claim 1 further comprising:
   an input data interface coupled to receive a plurality of input clock groups, with each input clock group including a source-supplied clock signal input and an associated set of data inputs;
   a system clock input for receiving a clean copy of a system clock;

an internal receiver core clock domain utilizing an internal core clock derived from the clean copy of the system clock; and a receiver interface for sampling address, command, and write data utilizing source-supplied clock signals received at the source-supplied clock signal input of each input clock group to sample data signals concurrently received at the associated set of data inputs of the input clock group and for transferring sampled data to the internal core clock domain utilizing a received clean copy of the system clock.

3. The system of claim 1 further comprising:

deskew logic for aligning the clock signals received in different input clock groups.

4. A system increasing the speed of an external memory integrated circuit storing M Mbytes of data, said system comprising:

means for outputting data from the memory integrated circuit;

means for inputting addresses to the memory integrated circuit;

a memory bank, included in the integrated circuit, with the memory bank having a data output and an address input and with the memory bank completing a read or write transaction in a cycle time of $T_c$;

means, including a plurality of clocked repeaters and coupled to said means for outputting and to the data output of a said memory bank, for pipelining read data output by the memory banks to the means for outputting with a pipeline clock cycle time of about $T_c$;

means, including a plurality of clocked repeaters and coupled to the address input and to the means for inputting addresses, for pipelining address data from the means for inputting addresses to the address inputs with a pipeline clock cycle of $T_c$.

5. The system of claim 4 further comprising:

an input data interface coupled to receive a plurality of input clock groups, with each input clock group including a source-supplied clock signal input and an associated set of data inputs;

a system clock input for receiving a clean copy of a system clock;

an internal receiver core clock domain utilizing an internal core clock derived from the clean copy of the system clock; and means for sampling address, command, and write data utilizing source-supplied clock signals received at the source-supplied clock signal input of each input clock group to sample data signals concurrently received at the associated set of data inputs of the input clock group and for transferring sampled data to the internal core clock domain utilizing a received clean copy of the system clock.

6. The system of claim 5 further comprising:

means for aligning the clock signals received in different input clock groups.

7. In a memory device, an improved system for sampling data, the system comprising:

an input data interface coupled to receive a plurality of input clock groups, with each input clock group including a source-supplied clock signal input and an associated set of data inputs;

a system clock input for receiving a clean copy of a system clock;

an internal receiver core clock domain utilizing an internal core clock derived from the clean copy of the system clock; and means for sampling address, command, and write data utilizing source-supplied clock signals received at the source-supplied clock signal input of each input clock group to sample data signals concurrently received at the associated set of data inputs of the input clock group and for transferring sampled data to the internal core clock domain utilizing a received clean copy of the system clock.

8. The system of claim 7 further comprising:

means for aligning the clock signals received in different input clock groups.

9. A system increasing the speed of an external memory integrated circuit storing M Mbytes of data, said system comprising:

means for outputting data from the memory integrated circuit;

means for inputting addresses to the memory integrated circuit;

a plurality of arrays of N memory banks, included in the integrated circuit, with each memory bank holding only a portion of the M Mbytes of data and having a data output and an address input and with each memory bank completing a read or write transaction in a cycle time of $T_c$;

means coupled in parallel to all data outputs of the memory banks in an array for reading data from the memory banks;

means coupled in parallel to all address inputs of the memory banks in an array for supplying address data to the memory banks;

means, including a plurality of clocked repeaters and coupled to said means for outputting and said means for reading, for pipelining read data output by the memory banks to the means for outputting with a pipeline clock cycle time of about $T_c$;

means, including a plurality of clocked repeaters and coupled to the means for supplying address data and to the means for inputting addresses, for transferring address data from the means for inputting addresses to the means coupled in parallel to all address.

* * * * *